(12) United States Patent
Lee et al.

(10) Patent No.: US 9,149,782 B2
(45) Date of Patent: Oct. 6, 2015

(54) METHOD FOR THE FAST FORMATION OF A GAS HYDRATE

(75) Inventors: Jae Woo Lee, Closter, NJ (US); Cheol Ho Kim, Ulsan (KR); Jae Ik Lee, Busan (KR); Ho Kyeong Kim, Changwon-si (KR); Hyo Kwan Leem, Busan (KR)

(73) Assignee: STX OFFSHORE & SHIPBUILDING CO., LTD., Gyeongsangnam-Do (KR)

( * ) Notice: Subject to any disclaimer, the term of this patent is extended or adjusted under 35 U.S.C. 154(b) by 645 days.

(21) Appl. No.: 13/517,435

(22) PCT Filed: Jan. 25, 2010

(86) PCT No.: PCT/KR2010/000448
§ 371 (c)(1),
(2), (4) Date: Jun. 20, 2012

(87) PCT Pub. No.: WO2011/090229
PCT Pub. Date: Jul. 28, 2011

(65) Prior Publication Data
US 2012/0260680 A1 Oct. 18, 2012

(51) Int. Cl.
*B01J 10/00* (2006.01)
*C10L 3/10* (2006.01)

(52) U.S. Cl.
CPC ............. *B01J 10/002* (2013.01); *C10L 3/108* (2013.01); *B01J 2219/00029* (2013.01); *B01J 2219/00069* (2013.01); *B01J 2219/00081* (2013.01)

(58) Field of Classification Search
CPC ...................................... C10L 3/108
USPC ......................................... 585/15
See application file for complete search history.

(56) References Cited

U.S. PATENT DOCUMENTS

| 4,333,315 | A | * | 6/1982 | Zemelman et al. ................. 62/1 |
| 4,347,707 | A | * | 9/1982 | Zemelman et al. ............... 62/69 |
| 6,653,516 | B1 | * | 11/2003 | Yoshikawa et al. ............. 585/15 |
| 6,855,852 | B1 | * | 2/2005 | Jackson et al. .................. 585/15 |

(Continued)

FOREIGN PATENT DOCUMENTS

| JP | H06-25021 A | 2/1994 |
| JP | H11-130700 A | 5/1999 |

(Continued)

OTHER PUBLICATIONS

JPO Office Action for Japanese Patent Application No. 2012-546975 which corresponds to the above-identified U.S. application (2012).

(Continued)

*Primary Examiner* — Ellen McAvoy
(74) *Attorney, Agent, or Firm* — LRK Patent Law Firm

(57) ABSTRACT

The present invention relates to a method for the fast formation of a gas hydrate. More specifically, the present invention relates to a method for the formation of a fed-batch-type gas hydrate, the method including a first step i) of injecting a fresh aqueous solution containing a potential feed hydrate into a reactor, a second step ii) of feeding gas into the reactor in which the fresh aqueous solution containing the potential feed hydrate is injected in the first step, so as to pressurize said gas, and a third step iii) of injecting a surfactant solution into the reactor in which the gas is pressurized in the second step, as well as to a method for the formation of a batch-type gas hydrate, in which the first step is switched in sequence with the third step.

13 Claims, 2 Drawing Sheets

(56) References Cited

U.S. PATENT DOCUMENTS

| | | | |
|---|---|---|---|
| 7,781,627 B2* | 8/2010 | Woo et al. | 585/15 |
| 7,863,491 B1* | 1/2011 | Bonso | 585/15 |
| 7,947,857 B2* | 5/2011 | Nazari et al. | 585/15 |
| 8,119,078 B2* | 2/2012 | Rogers et al. | 422/242 |
| 8,217,209 B2* | 7/2012 | Iwasaki et al. | 585/15 |
| 8,334,418 B2* | 12/2012 | Osegovic et al. | 585/15 |
| 8,354,565 B1* | 1/2013 | Brown et al. | 585/15 |
| 2007/0203374 A1 | 8/2007 | Woo et al. | |
| 2014/0363361 A1* | 12/2014 | Wang et al. | 423/262 |

FOREIGN PATENT DOCUMENTS

| | | |
|---|---|---|
| JP | 2008-231176 A | 10/2008 |
| KR | 10-0715329 B1 | 5/2007 |

OTHER PUBLICATIONS

Huang, D. & Fan, S., "Thermal Conductive of Methane Hydrate Formed from Sodium Dodecyl Sulfate Solution", J. Chem. Eng. Data 2004, vol. 49, 1479-1482 (Aug. 11, 2004).

\* cited by examiner

METHOD FOR THE FAST FORMATION OF A GAS HYDRATE

TECHNICAL FIELD

The present invention relates to a method for rapidly forming a gas hydrate. More particularly, the present invention relates to a fed-batch-type method for forming a gas hydrate, the method including (i) a first step of injecting a fresh aqueous solution containing a potential feed hydrate into a reactor, (ii) a second step of injecting a pressurized gas into the reactor, in which the fresh aqueous solution containing the potential feed hydrate is injected in the first step, and (iii) a third step of injecting a surfactant solution into the reactor, in which the pressurized gas is injected in the second step, and a batch-type method for forming a gas hydrate, in which the order of the first step and the third step is reversed.

BACKGROUND ART

Natural gas is a clean, safe and convenient fuel and has attracted much attention as an alternative energy to solid fuels such as oil, coal, etc. Moreover, the use of natural gas has continuously increased in various fields such as domestic, commercial, transport, and industrial uses and has become the foundation of the energy industry as an energy source that supplies about one fourth of the world's energy consumption together with solid fuels such as oil, coal, etc.

When the natural gas is extracted from a gas field and transported in a gaseous state, the volume is huge, and it may explode. Thus, to solve these problems, a method of cooling the natural gas to its liquefaction temperature to produce a liquefied natural gas (LNG) and storing and transporting the produced LNG in an LNG tank on an LNG carrier is mainly used. Typically, the liquefied natural gas contains about 600 times as much as natural gas per unit volume.

However, the liquefaction of methane gas as a main component of liquefied natural gas requires an extremely low temperature of about −162° C., which is very costly to manufacture a natural gas carrier for sea and land transport as well as a liquefied natural gas production facility.

Another method for storing and transporting natural gas is to use a compressed gas. However, the production of large vessels is technically difficult and requires a high cost due to high storage pressure, and it has a safety problem due to high pressure explosion.

On the contrary, natural gas hydrate provides about 170 times as much as gas per unit volume and is produced at relatively moderate pressure and temperature (at 40 bar and 3° C.). Once the gas hydrate is formed, the preservation of gas hydrate is made at −20° C. and 1 atmospheric pressure. These temperature and pressure conditions of natural gas hydrate are more moderate than those of liquefied natural gas and compressed gas.

Moreover, even when the natural gas hydrate is exposed to room temperature and atmospheric pressure, it is less likely to explode, and thus it is possible to ensure sufficient time to cope with any leakage or damage of the system, thus ensuring safety. That is, the storage and transportation of natural gas hydrate are safer and more economical than those of liquefied natural gas (LNG) or compressed natural gas (CNG).

The natural gas hydrate is a compound in the form of dry ice formed by the physical combination of gas and water at low temperature and high pressure rather than the chemical combination. The calorific value of 1 m³ of gas hydrate is the same as about 180 m³ of natural gas. Naturally, the natural gas hydrate is found as a crystal, in which gas and water are combined, in the submarine or frozen earth where the temperature is low and the pressure is high. Moreover, the natural gas hydrate is easily decomposed into gas and water under dissociation conditions.

The natural gas hydrate can be classified into I-type, II-type, H-type, etc. according to the molecular structure. The natural gas hydrate is similar to ice in appearance but has a structure different from that of ice. While ice has a two-dimensional planar structure at a low temperature near 0° C., when the natural gas hydrate is maintained at an appropriate pressure (20 to 40 bar), a water molecule forms a three-dimensional cavity structure.

Assuming a spherical body, the size of a single cavity is about 1 nanometer, the unit cell size is about 2 nanometers, and the natural gas flows into the cavity. That is, water molecules connected by hydrogen bonds become a "host", and gas molecules become a "guest". The general formula of gas hydrate is $Gas(H_2O)_n$, where n denotes the hydration number and has about 5 to 8 depending on the size is of the gas molecule. The van der Waals force acts between nonpolar gas molecules and water molecules.

A typical method for forming a natural gas hydrate is a bubbling method in which a high pressure cooled natural gas supplied through a gas nozzle installed at the top of a reactor is in contact with water injected through a nozzle installed below the gas nozzle or through a porous plate installed at the bottom of the reactor, thus forming a natural gas hydrate. According to this method, the overall reaction is an exothermic reaction, and thus a cooling system is installed in the reactor to remove heat generated during the reaction or a system for lowering the temperature of the reactor is provided on the outside of the reactor.

However, according to this method, the formed natural gas hydrates may cause plugging in a raw water or natural gas injection nozzle, and when an injection plate is used, the mass transfer resistance increases during the formation reaction due to the large diameter of the formed raw water particles, which is problematic. Moreover, it is difficult to separate the formed natural gas hydrates from unreacted water, and the amount of unreacted water increases due to low conversion rate, which in turn increases the amount of energy required for separation and reuse processes.

Moreover, existing methods for forming natural gas hydrates have many problems in industrialization due to long induction time for hydrates and low hydrate crystal growth rate. Here, the induction time for hydrates may be defined as a period during which the hydrate is maintained in a meta-stable liquid state until solid gas hydrate crystals are formed, and the induction time for methane hydrates is generally several days.

Recently, Rogers and Zhong have reported that the induction time for ethane hydrates was reduced to about 40 minutes when a surfactant of sodium dodecyl sulfate (SDS) and a double-cooling system in the inside and outside of a reactor were used (2002). Here, the overall production rate of ethane hydrates was increased about 700 times compared to the non-use of SDS.

However, the crystal nucleation (hydrate crystal induction) is probabilistic, and the fast induction does not occur consistently and repeatedly even under the same experimental conditions and the same surfactant concentration and is affected by various factors such as impurities in an aqueous solution, external vibration, cooling method, etc.

Thus, there is an urgent need for the development of a new method for forming a gas hydrate, which can solve the above-described problems associated with the existing methods for forming gas hydrates and increase the gas hydrate crystal growth rate without any induction time for gas hydrates, in the utilization of natural gas energy.

Disclosure

Technical Problem

Accordingly, the present invention has been made to solve the above-described problems, and an object of the present invention is to form a gas hydrate at a high crystal growth rate without any induction time in a reaction with a single external cooling device using a small amount of potential feed hydrate solution which can form seed hydrate particles.

Technical Solution

The above object of the present invention is achieved by providing a fed-batch-type method for forming a gas hydrate, the method comprising: (i) a first step of injecting a fresh aqueous solution containing a potential feed hydrate into a reactor; (ii) a second step of injecting a pressurized gas into the reactor, in which the fresh aqueous solution containing the potential feed hydrate is injected in the first step; and (iii) a third step of injecting a surfactant solution into the reactor, in which the pressurized gas is injected in the second step.

Moreover, the above object of the present invention is achieved by providing a fed-batch-type method for forming gas hydrate, the method comprising: (i) a first step of injecting a pressurized gas into a reactor; (ii) a second step of injecting a fresh aqueous solution containing a potential feed hydrate into the reactor, in which the pressurized gas is injected in the first step; and (iii) a third step of injecting a surfactant solution into the reactor, in which the fresh aqueous solution containing the potential feed hydrate is injected in the second step.

Furthermore, the above object of the present invention is achieved by providing a fed-batch-type method for forming a gas hydrate, the method comprising: (i) a first step of simultaneously injecting a pressurized gas and a fresh aqueous solution containing a potential feed hydrate into a reactor; and (ii) a second step of injecting a surfactant solution into the reactor, in which the pressurized gas and the fresh aqueous solution containing the potential feed hydrate are simultaneously injected in the first step.

In addition, the above object of the present invention is achieved by providing a batch-type method for forming a gas hydrate, the method comprising: (i) a first step of injecting a surfactant solution into a reactor; (ii) a second step of injecting a pressurized gas into the reactor, in which the surfactant solution is injected in the first step; and (iii) a third step of injecting a fresh aqueous solution containing a potential feed hydrate into the reactor, in which the pressurized gas is injected in the second step.

Additionally, the above object of the present invention is achieved by providing a batch-type method for forming a gas hydrate, the method comprising: (i) a first step of injecting a surfactant solution into a reactor; (ii) a second step of injecting a fresh aqueous solution containing a potential feed hydrate into the reactor, in which the surfactant solution is injected in the first step; and (iii) a third step of injecting a pressurized gas into the reactor, in which the fresh aqueous solution containing a potential feed hydrate is injected in the second step.

Moreover, the above object of the present invention is achieved by providing a batch-type method for forming a gas hydrate, the method comprising: (i) a first step of injecting a surfactant solution into a reactor; and (ii) a second step of simultaneously injecting a pressurized gas and a fresh aqueous solution containing a potential feed hydrate into the reactor, in which the surfactant solution is injected in the first step.

Furthermore, the above object of the present invention is achieved by providing a batch-type method for forming a gas hydrate, the method comprising: (i) a first step of injecting a pressurized gas into a reactor; (ii) a second step of injecting a surfactant solution into the reactor, in which the pressurized gas is injected in the first step; and (iii) a third step of injecting a fresh aqueous solution containing a potential feed hydrate into the reactor, in which the surfactant solution is infected in the second step.

Advantageous Effects

The present invention provides a new method for rapidly forming a gas hydrate from a fresh aqueous solution without using the memory effect of water or using already formed gas hydrate particles. According to the present invention, seed hydrates are formed in a reactor using a small amount of potential feed hydrate solution under relatively moderate temperature and pressure conditions, and natural gas hydrates are formed on the seed hydrates in the reactor, thus causing a rapid reaction.

The formation of seed hydrates in the reactor is achieved at a temperature above the freezing point of water and at a normal pressure or a low pressure below 10 bar. The seed hydrates can form gas hydrates together with an aqueous solution containing a small amount of surfactant without any induction time for hydrates, and the hydrates having a porous structure are formed along the wall of the reactor. This method for rapidly forming the hydrates can be applied to both a batch-type process and a fed-batch-type process.

Figure 1:
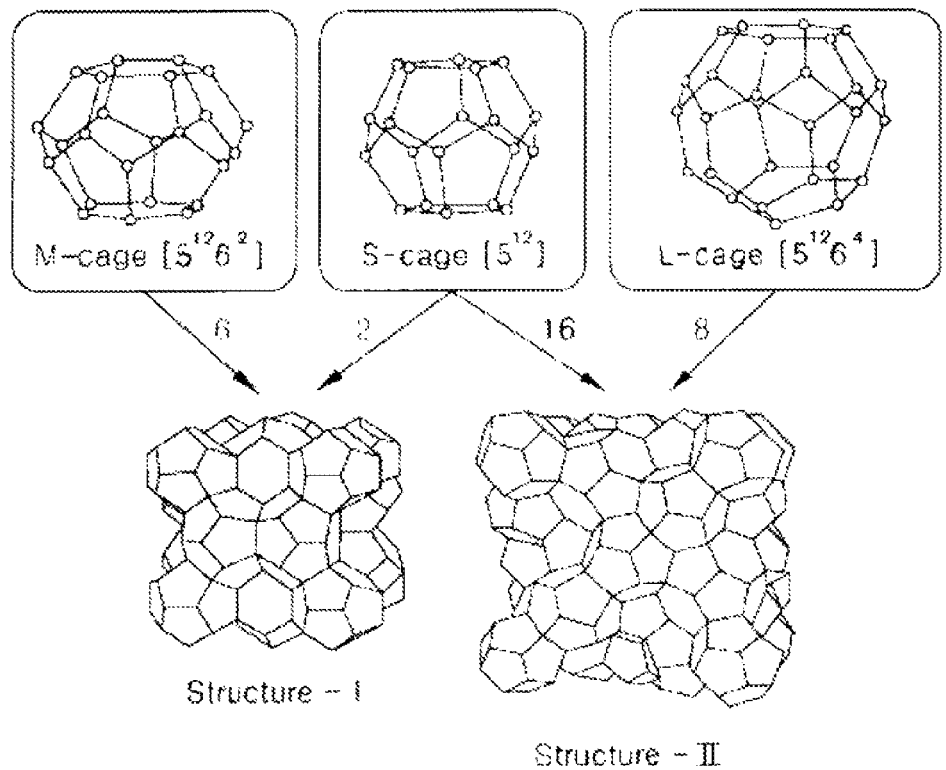
FIG. 1 shows the structures of sI-type and sII-type gas hydrate molecules.

| Description of Reference Numerals | |
|---|---|
| 1: gas tank | |
| 2: mass flow controller (MFC) | |
| 3: gas injection line | |
| 4: liquid injection line | |
| 5: liquid pump | 6: gas vent line |
| 8: solution tank | 9: reactor |
| 10: coolant in-and-out | 11: cooling device |
| 12: data link | 13: PC |
| 14: data acquisition board | |

MODE FOR INVENTION

A fed-batch-type method for forming a gas hydrate according to the present invention may comprise (i) a first step of injecting a fresh aqueous solution containing a potential feed hydrate into a reactor, (ii) a second step of injecting a pressurized gas into the reactor, in which the fresh aqueous solution containing the potential feed hydrate is injected in the first step, and (iii) a third step of injecting a surfactant solution into the reactor, in which the pressurized gas is injected in the second step.

Moreover, a fed-batch-type method for forming a gas hydrate according to the present invention may comprise (i) a first step of injecting a pressurized gas into a reactor, (ii) a second step of injecting a fresh aqueous solution containing a potential feed hydrate into the reactor, in which the pressurized gas is injected in the first step, and (iii) a third step of injecting a surfactant solution into the reactor, in which the fresh aqueous solution containing the potential feed hydrate is injected in the second step.

Furthermore, a batch-type method for forming a gas hydrate according to the present invention may comprise (i) a first step of simultaneously injecting a pressurized gas and a fresh aqueous solution containing a potential feed hydrate into a reactor and (ii) a second step of injecting a surfactant solution into the reactor, in which the pressurized gas and the fresh aqueous solution containing the potential feed hydrate are simultaneously injected in the first step.

Here, the potential feed hydrate is a compound which may act as a seed for forming a hydrate and may be an sI, sII, or sH hydrate former or a salt which forms a semi-clathrate compound.

The sI, sII, and sH hydrates are the classifications according to the hydrate molecular structure. In particular, the H-type hydrate could have been artificially formed only in a laboratory and has recently been found at a depth of 200 to 500 m along the west coast of Canada (see FIG. 1).

The semi-clathrate compound refers to a clathrate compound having a structure in which one molecule forms a three-dimensional network structure and the other module enters the space of the structure.

The feed hydrate solution may comprise at least one selected from the group consisting of tetrahydrofuran (THF), 1,3-dioxolane, tetrahydropyran, cyclopentane, acetone, difluoromethane (HFC-32), isobutane, iso-butylene, n-butane, propane, LPG (C3+C4), methylcyclohexane, methylcyclopetane, neohexane, methyl-tert-butyl ether, adamantine, tetra-n-butylammonium bromide, tetra-n-butylammonium fluoride, and tetra-n-butylammonium chloride.

Meanwhile, as another potential feed hydrate, it is possible to use an ice slurry of a surfactant such as sodium dodecyl sulfate (SDS), diisooctyl sodium sulfosuccinate (DSS), sodium tetradecyl sulfate, sodium hexadecyl sulfate, sodium dodecylbenzene sulfonate, xylenesulfonate, sodium oleate, 4-n-decylbenzenesulfonate, sodium laurate, 4-dodecylbenzenesulfonic acid, dodecylamine hydrochloride, dodecyltrimethylammonium chloride, 4-n-octylbenzene sulfonate, ethoxylated sulfonate, decylbenzenesulfonate, potassium oleate, n-decylbenzene sulfonate, alkyltrimethylammonium bromide (C10-C16 chains), dodecyl amine, tetradecyltrimethylammonium chloride, dodecyl polysaccharide glycoside, cyclodextrins, glycolipids, lipoprotein-lipopeptides, phospholipids, para-toluene sulfonic acid, trisiloxane, and triton X-100.

The amount of the above-described potential feed hydrate solution may be about 5% of the overall volume of the surfactant solution.

The potential feed hydrate solution directly forms seed hydrates together with the gas (e.g., methane gas at 35 to 100 bar) injected into the cooled reactor.

The gas may be fed into the reactor before or after the potential feed hydrate solution is injected or at the same time.

The cooling of the reactor may be performed before the gas is fed into the reactor, before the potential feed hydrate solution is fed into the reactor, or before the surfactant solution is fed into the reactor.

It is preferred that the cooling temperature of the rector be −5 to 5° C. and the pressure of the pressurized gas be 10 to 50 bar higher than the equilibrium pressure of the gas hydrate. That is, the reaction takes place under relatively moderate temperature and pressure conditions.

The injected pressurized gas may include any gas, which can form a hydrate, such as methane, ethane, propane, carbon dioxide, or mixtures thereof.

When the surfactant solution is injected into the reactor in which seed hydrates are formed, the gas hydrates can be directly formed without any induction time. That is, when the surfactant solution is in contact with the gas, gas hydrates having a porous structure are formed along the wall of the reactor, which allows the gas to be easily in contact with the unreacted solution and easily dissipates the reaction heat, thus increasing the gas storage density and conversion yield.

The surfactant solution used may comprise at least one compound selected from the group consisting of sodium dodecyl sulfate (SDS), diisooctyl sodium sulfosuccinate (DSS), sodium tetradecyl sulfate, sodium hexadecyl sulfate, sodium dodecylbenzene sulfonate, xylenesulfonate, sodium oleate, 4-n-decylbenzenesulfonate, sodium laurate, 4-dodecylbenzenesulfonic acid, dodecylamine hydrochloride, dodecyltrimethylammonium chloride, 4-n-octylbenzene sulfonate, ethoxylated sulfonate, decylbenzenesulfonate, potassium oleate, n-decylbenzene sulfonate, alkyltrimethylammonium bromide (C10-C16 chains), dodecyl amine, tetradecyltrimethylammonium chloride, dodecyl polysaccharide glycoside, cyclodextrins, glycolipids, lipoprotein-lipopeptides, phospholipids, para-toluene sulfonic acid, trisiloxane, and triton X-100. Moreover, it is preferred that the concentration of the surfactant solution be about 50 to 2,000 ppm.

Meanwhile, the method for forming the gas hydrate according to the present invention can be applied to a batch-type method. In this case, the batch-type method for forming a gas hydrate according to the present invention may comprise (i) a first step of injecting a surfactant solution into a reactor, (ii) a second step of injecting a pressurized gas into the reactor, in which the surfactant solution is injected in the first step, and (iii) a third step of injecting a fresh aqueous solution containing a potential feed hydrate into the reactor, in which the pressurized gas is injected in the second step.

Moreover, the batch-type method for forming a gas hydrate according to the present invention may comprise (i) a first step of injecting a surfactant solution into a reactor, (ii) a second step of injecting a fresh aqueous solution containing a potential feed hydrate into the reactor, in which the surfactant solution is injected in the first step, and (iii) a third step of injecting a pressurized gas into the reactor, in which the fresh aqueous solution containing a potential feed hydrate is injected in the second step.

Furthermore, the batch-type method for forming a gas hydrate according to the present invention may comprise (i) a first step of injecting a surfactant solution into a reactor and (ii) a second step of simultaneously injecting a pressurized gas and a fresh aqueous solution containing a potential feed hydrate into the reactor, in which the surfactant solution is injected in the first step.

In addition, the batch-type method for forming a gas hydrate according to the present invention may comprise (i) a first step of injecting a pressurized gas into a reactor, (ii) a second step of injecting a surfactant solution into the reactor, in which the pressurized gas is injected in the first step, and (iii) a third step of injecting a fresh aqueous solution containing a potential feed hydrate into the reactor, in which the surfactant solution is injected in the second step.

The surfactant solution and the potential feed hydrate solution, which can be used in the above-described batch-type method for forming the gas hydrate, are the same as those used in the above-described fed-batch-type method. In the batch-type method, the seeds hydrates are formed on the previously injected surfactant solution.

That is, when the potential feed hydrate solution fed into the reactor and the pressurized gas (e.g., methane gas at 35 to 100 bar) fed into the cooled reactor form seed hydrates, the seed hydrates form the gas hydrates together with the surfactant solution previously injected into the reactor without any induction time.

The gas may be fed into the reactor before or after the potential feed hydrate solution is injected or at the same time, and the cooling of the reactor may be performed before the gas is fed into the reactor, before the potential feed hydrate solution is fed into the reactor, or before the surfactant solution is fed into the reactor.

Here, like the fed-batch-type method, it is preferred that the cooling temperature of the rector be −5 to 5° C. and the pressure of the pressurized gas be 10 to 50 bar higher than the equilibrium pressure of the gas hydrate.

Figure 2:
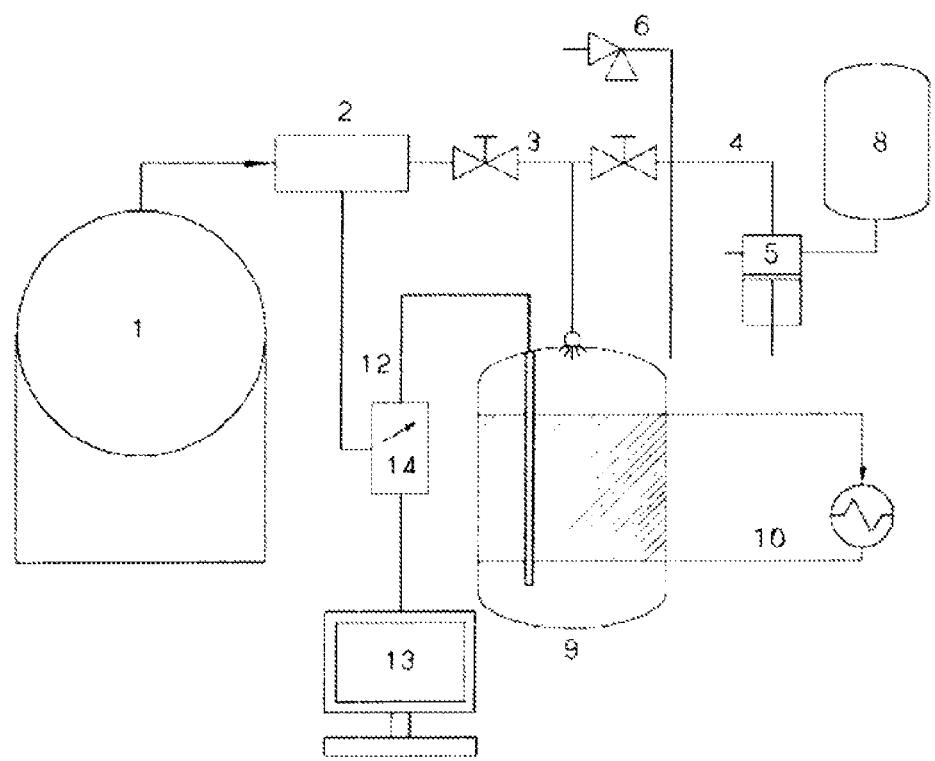
FIG. 2 is a detailed diagram of an apparatus for forming a gas hydrate using a method for forming a gas hydrate according to the present invention.

FIG. 2 shows an experimental apparatus using the formation method of the present invention, in which a gas is supplied from a gas tank 1 through a pipe 3, a mass flow controller 2 is installed to measure the amount of gas injected according to the formation of the gas hydrate, and a surfactant solution is supplied to a reactor 9 through a liquid injection line 4 by a high pressure liquid pump 5. Moreover, a gas vent line 6 is installed at the top of the reactor 9. Coolant in-and-out lines 10 connect a cooling device 11 equipped with a temperature controller to the reactor 9 to lower the temperature of the reactor 9.

Next, Examples of the present invention will be described.

EXAMPLE 1

The following table 1 shows the results of an experiment using a fresh THF solution as the feed hydrate solution. First, a 0.02 L mixed solution of a 500 ppm SDS solution and a 4 wt % THF solution was fed into a reactor. Then, the temperature of the reactor was lowered to about 0° C. by an external cooling device, and methane gas was filled in the reactor at about 50 bar. Subsequently, 1 L of a 500 ppm SDS solution was injected into the reactor, thus forming gas hydrates.

In this experiment, the methane gas was stored in an amount about 173 times per unit volume at 0° C. and 1 atmospheric pressure. It could be seen that methane hydrates were formed along the wall of the reactor when the reactor was opened after the reaction.

TABLE 1

| | |
|---|---|
| Reactor Volume | 5 L |
| Fresh Seed THF Solution | 0.02 L |
| | (THF 4 wt % + SDS 500 ppm) |
| Methane Gas Consumption (Nm$^3$) | 193 |
| Aqueous SDS Solution (L) | 1.0 |
| Aqueous SDS Solution Injection Time (min) | 100 |
| Initial Reaction Temperature/Pressure | 0.1° C./50 bar |
| Volumetric Gas Storage Per Hydrate (v/v) | 173 |
| Induction time (min) for Methane Hydrates | 0 |

[Fed-batch Hydrate Formation from Fresh THF solution]

EXAMPLE 2

The following table 2 shows the results of an experiment using a fresh CP solution as the feed hydrate solution. The storage density of methane was somewhat lower than that in the above experiment. However, it was possible to maximize the amount of gas stored when the reaction temperature, the pressure, the liquid injection rate, etc. were optimized.

TABLE 2

| | |
|---|---|
| Reactor Volume | 5 L |
| Fresh Seed CP Solution | 0.02 L |
| | (CP 4 wt % + SDS 500 ppm) |
| Methane Gas Consumption (Nm$^3$) | 181 |
| Aqueous SDS Solution (L) | 1.0 |
| Aqueous SDS Solution Injection Time (min) | 100 |
| Initial Reaction Temperature/Pressure | 0.3° C./50 bar |
| Volumetric Gas Storage Per Hydrate (v/v) | 163 |
| Induction time (min) for Methane Hydrates | 0 |

[Fed-batch Hydrate Formation from Fresh CP solution]

In the above two Examples, the seed hydrates were formed during pressurization and cooling processes before injecting the SDS solution, and the gas hydrates were formed immediately after injecting the SDS solution.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A fed-batch-type method for forming a gas hydrate, the method comprising:
   (i) a first step of injecting a fresh aqueous solution containing a potential feed hydrate into a reactor;
   (ii) a second step of injecting a pressurized gas into the reactor, in which the fresh aqueous solution containing the potential feed hydrate and the surfactant is injected in the first step; and
   (iii) a third step of injecting a surfactant solution into the reactor, in which the pressurized gas is injected in the second step,
   wherein the potential feed hydrate is at least one of tetrahydrofuran and cyclopentane.

2. The method of claim 1, further comprising a step of cooling down the reactor before the pressurized gas is injected into the reactor.

3. The method of claim 2, wherein the cooling temperature of the reactor is −5 to 5° C.

4. The method of claim 1, further comprising a step of cooling down the reactor before the fresh aqueous solution containing the potential feed hydrate is injected into the reactor.

5. The method of claim 4, wherein the cooling temperature of the reactor is −5 to 5° C.

6. The method of claim 1, further comprising a step of cooling down the reactor before the surfactant solution is injected into the reactor.

7. The method of claim 6, wherein the cooling temperature of the reactor is −5 to 5° C.

8. The method of claim 1, wherein the gas injected into the reactor comprises methane, ethane, propane, carbon dioxide, or mixtures thereof.

9. The method of claim 8, wherein the pressure of the pressurized gas is 10 to 50 bar higher than the equilibrium pressure of the gas hydrate.

10. The method of claim 1, wherein the volume of the fresh aqueous solution containing the potential feed hydrate is within 5% of the overall volume of the surfactant solution.

11. The method of claim 1, wherein the surfactant comprises at least one compound selected from the group consisting of sodium dodecyl sulfate (SDS), diisooctyl sodium sulfosuccinate (DSS), sodium tetradecyl sulfate, sodium hexadecyl sulfate, sodium dodecylbenzene sulfonate, xylenesulfonate, sodium oleate, 4-n-decylbenzenesulfonate, sodium laurate, 4-dodecylbenzenesulfonic acid, dodecylamine hydrochloride, dodecyltrimethylammonium chloride, 4-n-octylbenzenesulfonate, ethoxylated sulfonate,decylbenzenesulfonate, potassium oleate, n-decylbenzene sulfonate, alkyltrimethylammonium bromide (C10-C16 chains), dodecyl amine, tetradecyltrimethylammonium chloride, dodecyl polysaccharide glycoside, cyclodextrins, glycolipids, lipoprotein-lipopeptides, phospholipids, para-toluene sulfonic acid, trisiloxane, and triton X-100.

12. The method of claim 1, wherein the concentration of the surfactant solution is 50 to 2,000 ppm.

13. A fed-batch-type method for forming a gas hydrate, the method comprising:
  (i) a first step of injecting a pressurized gas into a reactor;
  (ii) a second step of injecting a fresh aqueous solution containing a potential feed hydrate into the reactor, in which the pressurized gas is injected in the first step; and
  (iii) a third step of injecting a surfactant solution into the reactor, in which the fresh aqueous solution containing the potential feed hydrate is injected in the second step,
  wherein the potential feed hydrate is at least one of tetrahydrofuran and cyclopentane.

* * * * *